United States Patent
Chang et al.

(10) Patent No.: US 7,130,668 B2
(45) Date of Patent: Oct. 31, 2006

(54) METHOD AND SYSTEM FOR CONTROLLING SLEEP MODE IN BROADBAND WIRELESS ACCESS COMMUNICATION SYSTEM

(75) Inventors: Sun-Ny Chang, Suwon-si (KR); Yun-Sang Park, Suwon-si (KR); Jeong-Hoon Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 125 days.

(21) Appl. No.: 10/881,507

(22) Filed: Jun. 30, 2004

(65) Prior Publication Data

US 2005/0049013 A1    Mar. 3, 2005

(30) Foreign Application Priority Data

Sep. 1, 2003   (KR) ............. 10-2003-0060929
Sep. 9, 2003   (KR) ............. 10-2003-0063292
Dec. 23, 2003  (KR) ............. 10-2003-0095481

(51) Int. Cl.
*H04B 1/38* (2006.01)
*H04B 1/16* (2006.01)
*H04M 3/00* (2006.01)
*H01Q 11/12* (2006.01)
*G08C 17/00* (2006.01)

(52) U.S. Cl. ............... 455/574; 455/550.1; 455/572.1; 455/418; 455/127.5; 455/343.2; 370/311

(58) Field of Classification Search .. 455/456.3–456.6, 455/418–420, 426.1, 426.2, 463, 466, 522, 455/515–520, 526, 574, 550.1, 560–561, 455/127.5, 343.2, 343.3, 343.4, 343.5, 453; 340/593.3, 7.32–7.33, 7.36, 10.32, 10.33, 340/10.34; 370/311

See application file for complete search history.

(56) References Cited

U.S. PATENT DOCUMENTS 5,826,173 A * 10/1998 Dent ................. 340/7.38

(Continued)

FOREIGN PATENT DOCUMENTS

EP    0 896 489    2/1999

(Continued)

OTHER PUBLICATIONS

Yoon et al., "Enhancement on Sleep Mode Operation in the 802.16e", IEEE 802.16 Broadband Wireless Access Working Group, Sep. 4, 2003.

(Continued)

*Primary Examiner*—Charles N. Appiah
*Assistant Examiner*—Meless Zewdu
(74) *Attorney, Agent, or Firm*—Dilworth & Barrese LLP

(57) ABSTRACT

A method and a system is disclosed for controlling a sleep mode in broadband wireless access communication system. The subscriber terminals are managed by grouping the subscriber terminals in a broadband wireless access communication system, so an efficiency for controlling the sleep mode of the broadband wireless access communication system may increase. A further advantage is provided that each point of time for transmitting a paging message of each group is established differently from each other within a unit time slot for controlling the sleep mode, such that subscriber terminals are managed according to groups. Another advantage is provided that the base station can previously find subscriber terminals awaking at each point of time for transmission the paging message of each other from among subscriber terminals having the sleep mode, so an efficiency for controlling the sleep mode of the broadband wireless access communication system may increase.

26 Claims, 11 Drawing Sheets

U.S. PATENT DOCUMENTS

| | | | |
|---|---|---|---|
| 5,991,635 A * | 11/1999 | Dent et al. | 455/517 |
| 6,356,538 B1 * | 3/2002 | Li | 370/311 |
| 6,480,476 B1 * | 11/2002 | Willars | 370/311 |
| 6,480,504 B1 * | 11/2002 | Wang et al. | 370/442 |
| 6,519,469 B1 * | 2/2003 | Rydnell et al. | 455/466 |
| 6,526,516 B1 * | 2/2003 | Ishikawa et al. | 713/340 |
| 6,622,251 B1 * | 9/2003 | Lindskog et al. | 713/300 |
| 2002/0132603 A1 * | 9/2002 | Lindskog et al. | 455/343 |
| 2003/0031140 A1 * | 2/2003 | Oprescu-Surcobe et al. | 370/311 |

FOREIGN PATENT DOCUMENTS

| | | |
|---|---|---|
| EP | 1 335 527 | 8/2003 |
| WO | WO 01/69859 | 9/2001 |
| WO | WO 03/051077 | 6/2003 |

OTHER PUBLICATIONS

Stanwood, "Supporting Material for Comments on Sleep Mode", IEEE 802.16 Broadband Wireless Access Working Group, Jul. 11, 2003.

* cited by examiner

METHOD AND SYSTEM FOR CONTROLLING SLEEP MODE IN BROADBAND WIRELESS ACCESS COMMUNICATION SYSTEM

PRIORITY

This application claims priority to applications entitled "Method and System for Controlling Sleep Mode in Broadband Wireless Access Communication System" filed in the Korean Industrial Property Office on Sep. 1, 2003, on Sep. 9, 2003, and on Dec. 23, 2003 and assigned Ser. Nos. 2003-60929, 2003-63292 and 2003-95481, respectively, the contents of which are hereby incorporated by reference.

BACKGROUND OF THE INVENTION

1. Field of the Invention

The present invention relates to a broadband wireless access communication systems, and more particularly to a method and a system for controlling a sleep mode in a broadband wireless access communication system.

2. Description of the Related Art

In conventional cellular networks, such as CDMA (Code Division Multiplex Access) and GSM (Global System for Mobile communication) networks, a sleep mode is realized by means of a slotted paging manner. That is, terminals operated in the conventional cellular networks may stay in a sleep mode having little power consumption if a terminal mode is not an active mode. In this state, the terminals often awake to check whether or not a paging message has been transmitted to the terminals. In a case in which the paging message has been transmitted to the terminals, the terminal mode is shifted from the sleep mode into the active mode. In addition, if the paging message is not transmitted to the terminals, the terminals enter into the sleep mode again.

At this time, since a paging slot is assigned between a base station and the terminals, each terminal awakes at a predetermined paging slot assigned thereto in order to check the paging message transmitted thereto. That is, a terminal in a CDMA network has an assigned paging slot and a terminal in a GSM network has an assigned paging group, so that it is enough for the terminals of the CDMA and GSM networks to awake once for a predetermined time period. Also, since the predetermined time period is fixed by a system, the system can easily manage the operation of the terminals.

However, it is difficult to control the sleep mode in a broadband wireless access communication system (called "4$^{th}$ generation communication system") which has been actively studied and developed in order to support a high-speed service. The reason is that a sleep interval exponentially increases in the sleep mode proposed by an IEEE 802.16e communication system which is achieved by supplementing an IEEE 802.16a communication system with mobility of subscribers. That is, since the sleep interval exponentially increases in the IEEE 802.16e communication system, it is difficult for the IEEE 802.16e communication system to manage a start time of a sleep mode, a sleep interval, and an awaking point. Accordingly, it is difficult for the IEEE 802.16e to control the sleep mode.

FIG. 1 is a view schematically showing a procedure for controlling a sleep mode proposed by an IEEE 802.16e communication system. Conventionally, a sleep mode of the IEEE 802.16e communication system is started according to either a request of a subscriber terminal or a control command of a base station. FIG. 1 shows a method of starting the sleep mode according to the request the subscriber terminal request.

Referring to FIG. 1, a subscriber terminal 10 transmits a sleep request message (SLP-REQ message) to a base station 20 in order to enter into the sleep mode (S31). At this time, the subscriber terminal sends a required minimum size value (e.g., a min-window), a required maximum size value (e.g., a max-window), and a required value of a listening interval, which is a time slot where a corresponding terminal awakes to check whether a page message was transmitted to the subscriber terminal. A unit of each value is a frame.

Then, the base station 20 receiving the SLP-REQ message carries out a sleep time scheduling with reference to preset sleep control information (e.g. an admittable min-window, an admittable max-window, and an admittable listening interval) (S32). In addition, the base station 20 sends a sleep response message (SLP-RSP message) to the subscriber terminal 10 (S33). At this time, the base station transmits the number of frames remaining until the subscriber terminal 10 enters into the sleep mode (which is referred to start-time), a minimum time slot value (min-window value), a maximum time slot value (max-window value), and a listening interval value, which are approved by the base station. In this case, a unit of each value is a frame.

Meanwhile, the subscriber terminal 10 receiving the SLP-RSP message enters into the sleep mode at the start time included in the SLP-RSP message (S34). Also, the subscriber terminal 10 awakes after the sleep interval elapses, and checks whether any packet data (PDU) has been transmitted from the base station 20. That is, the subscriber terminal 10 enters into the awake mode after the sleep interval has been passed (S35), and confirms a traffic indication message (TRF-IND message, also called a paging message) broadcasted from the base station 20 during the listening interval (S36). The TRF-IND message is information broadcast to the subscriber terminal 10 by the base station 20 and includes basic Connection IDentifiers (CIDs) of subscriber terminals receiving PDU data.

The subscriber terminal 10 determines whether or not its basic CID is included in the TRF-IND message so as to decide whether or not the subscriber terminal 10 should awake. That is, if a BCID of the subscriber terminal 10 is included in the received TRF-IND message, the subscriber terminal 10 will recognize the existence of PDU data that was transmitted to the subscriber terminal, and the subscriber terminal 10 will awaken. That is, if the TRF-IND message received by the subscriber terminal 10 is a positive traffic indication (S37), the subscriber terminal 10 performs a state transition into the active mode (S38).

In contrast, if the BCID of the subscriber terminal 10 is not included in the received TRF-IND message, the subscriber terminal 10 determines that no PDU data was transmitted to the subscriber terminal, the subscriber terminal 10 will enter the sleep mode again. That is, if the TRF-IND message received by the subscriber terminal 10 is a negative traffic indication, the state of the subscriber terminal 10 is shifted into the sleep mode (S34), and the base station 20 waits for the subscriber terminal 10 to awake during the sleep interval.

At this time, the subscriber terminal 10 increases the sleep interval to twice as long as the previous sleep interval, and keeps the sleep mode (S34) during the increased sleep interval. The subscriber terminal 10 repeatedly performs the sleep mode and the awake mode until the state of the subscriber terminal 10 is shifted into the active mode. Whenever the subscriber terminal 10 repeatedly performs the sleep mode and the awake mode, the subscriber terminal 10 increases the sleep interval to twice as long as the previous sleep interval in such a manner that the sleep interval reaches the maximum time slot allotted to the subscriber terminal 10 by the base station 20.

As described above, the IEEE 802.16e communication system executes a sleep mode while increasing the sleep interval twice as long as the previous sleep interval according to a sleep update algorithm. Accordingly, since the IEEE 802.16e communication system exponentially increases the sleep interval, it is difficult for the base station to integrally manage the sleep intervals of subscriber terminals.

Meanwhile, the IEEE 802.16e communication system defines three message types communicated between the subscriber terminal and the base station for allowing the subscriber terminal to enter into the sleep mode. That is, the three message types include a sleep request message (SLP-REQ message), a sleep response message (SLP-RSP message), and a traffic indication message (TRF-IND message).

FIGS. 2*a* to 2*d* show the format of messages communicated between the base station and the subscriber terminal in order to control the sleep mode, as described above. FIG. 2*a* shows a format of a sleep request message 40, FIG. 2*b* shows a format of a sleep response message 50*a* when rejecting sleep, and FIG. 2*c* shows a format of a sleep response message 50*b* when approving sleep. Also, FIG. 2*d* shows a traffic indication message format 60.

Referring to FIG. 2*a*, the SLP-REQ message 40 includes a management message type (MANAGEMENT MESSAGE TYPE; 8 bits) 41, a minimum window (MIN-WINDOW; 6 bits) 42, a maximum window (MAX-WINDOW; 10 bits) 43, and a listening interval (LISTENING INTERVAL; 8 bits) 44. The SLP-REQ message 40 is a dedicated message which is transmitted based on a connection identification (CID) of the subscriber terminal, and it is a message notifying that the subscriber terminal requests sleep.

At this time, the management message type (MANAGEMENT MESSAGE TYPE) 41 is information representing a type of a message which is currently transmitted. If the management message type is '45' (MANAGEMENT MESSAGE TYPE=45), the currently transmitted message is the SLP-REQ message. The management message type 41 is realized with 8 bits.

The minimum window MIN-WINDOW (that is, a minimum time slot) 42 represents a requested start value for the sleep interval (measured in frames) and the maximum window MAX-WINDOW (that is, a maximum time slot) 43 represents a requested stop value for the sleep interval (measured in frames). That is, the sleep interval is updated and exponentially increases from the minimum window value 42 to the maximum window value 43.

The listening interval LISTENING INTERVAL 44 represents a requested LISTENING INTERVAL (measured in frames).

At this time, the minimum window 42, the maximum window 43, and the listening interval 44 are established as a frame unit.

Referring to FIG. 2*b*, the SLP-RSP message 50*a* used for rejecting a sleep request includes a management message type (8 bits) 51*a*, a sleep approval SLEEP-APPROVED (1 bit) 52*a*, and a reserved field RESERVED (7 bits) 53*a*. Such a SLP-RSP message 50*a* is also a dedicated message which is transmitted based on a connection identification (CID) of the subscriber terminal. The SLP-RSP message 50*a* is a message for determining a sleep timing of the subscriber terminal after the base station scheduling a sleep time of the subscriber terminal.

At this time, the management message type 51*a* represents a type of a currently transmitted message. If the management message type is '46' (MANAGEMENT MESSAGE TYPE=46), the currently transmitted message is the SLP-RSP message.

The sleep approval (SLEEP-APPROVED) 52*a* is represented with one bit. The sleep approval 52*a* '0' represents that it is impossible to shift into the sleep mode (SLEEP-MODE REQUEST DENIED).

The reserved field (RESERVED) 53*a* is a field reserved for other use.

Referring to FIG. 2*c*, when the base station approves the sleep request, the SLP-RSP message 50*b* transmitted to the subscriber terminal includes a management message type (8 bits) 51*b*, a sleep approval (SLEEP-APPROVED: 1 bit) 52*b*, a start time (START-TIME: 7 bits) 53*b*, a minimum window (MIN-WINDOW) 54*b*, a maximum window (MAX-WINDOW) 55*b*, and a listening interval (LISTENING INTERVAL) 56*b*.

At this time, the management message type 51*b* represents a type of a currently transmitted message. If the management message type is '46' (MANAGEMENT MESSAGE TYPE=46), the currently transmitted message is the sleep response message.

The sleep approval (SLEEP-APPROVED) 52*b* is represented with one bit. The sleep approval '1' (SLEEP-MODE REQUEST APPROVED) represents that it is possible to shift into a sleep mode.

The start time START-TIME 53*b* is frame values before the subscriber terminal enters into the first sleep interval (the first SLEEP INTERVAL), in which a value of a frame receiving the sleep response message is not included in the frame values. That is, the subscriber terminal will perform the state transition into the sleep mode after both a frame next to the frame during which the sleep response message is received and one or more of the adjacent frames, as specified by the START-TIME elapse.

The minimum window 54*b* represents a start value for the SLEEP INTERVAL (measured in frames), and the maximum window 55*b* represents a stop value for the SLEEP INTERVAL (measured in frames). The listening interval 56*b* is a value for LISTENING INTERVAL (measured in frames).

Referring to FIG. 2*d*, the TRF-IND message 60 includes a management message type (8 bits) 61, the number of positive subscribers NUM-POSITIVE (8 bits) 62, and connection identifications of the positive subscribers (CIDs 63 and 64), each of which is represented by 16 bits. Such a TRF-IND message 60 is transmitted in a broadcasting method, which is different from the transmitting methods for the SLP-REQ message and the SLP-RSP message.

First, the management message type 61 represents a type of a message which is currently transmitted. The management message type 61 '47' (MANAGEMENT MESSAGE TYPE=47) represents that the currently transmitted message is the TRF-IND message.

The number of the positive subscribers 62 represents the number of subscriber terminals to which packet data must be transmitted. The connection identifiers (CIDs 63 and 64) of the positive subscribers include connection identification information corresponding to the number of the positive subscribers.

FIG. 3 explains a sleep interval update algorithm which is proposed for the IEEE 802.16e communication system. In FIG. 3, 'SS' refers to a subscriber terminal and 'BS' refers to a base station. Also, boxes including 'SS' and 'BS' refer to frames.

Referring to FIG. 3, the subscriber terminal SS requests the sleep mode to the base station BS in an $n^{th}$ frame (S71) and the base station BS responds to the request for the sleep mode in $n+1^{th}$ frame (S72) by specifying the start time of the sleep mode as $n+3^{th}$ frame. In this case, the subscriber terminal SS repeats the sleep interval and the listening interval. As shown in FIG. 3, an initial sleep interval has 2 frames, and a second sleep interval has 4 frames which are double to the number of frames of the initial sleep interval.

As described above, in the conventional IEEE 802.16e communication system, since subscriber terminals request sleep at different points of time and sleep intervals of subscriber terminals exponentially increase, it is difficult for the base station to manage the sleep intervals of the subscriber terminals and to manage the subscriber terminals by grouping the subscriber terminals.

SUMMARY OF THE INVENTION

Accordingly, the present invention has been made to solve the above-mentioned problems occurring in the prior art, and a first object of the present invention is to provide a method and a system for controlling a sleep mode in a broadband wireless access communication system, which are capable of improving operation efficiency of subscriber terminals by managing the subscriber terminals by grouping the subscriber terminals.

A second object of the present invention is to provide a method and a system for controlling a sleep mode in a broadband wireless access communication system, which are capable of managing subscriber terminals in a group unit by establishing different points of time for transmitting a paging message of each group unit within a unit time slot for controlling the sleep mode.

A third object of the present invention is to provide a method and a system for controlling a sleep mode, which a base station may recognize in advance in subscriber terminals, which terminals are awoken from the sleep mode when a paging message is transmitted in each group unit, thereby reducing an unnecessary paging message transmission so that efficiency of a broadband wireless access communication system is improved.

A fourth object of the present invention is to provide a method and a system for controlling a sleep mode, in which subscriber terminals of each group can directly enter into the sleep mode without reading and encoding all messages by receiving advance notice that no data exists to be transmitted to any of the subscriber terminals in a group.

In order to accomplish these objects, there is provided a method for controlling a sleep mode including sleep intervals and awake intervals in a broadband wireless access communication system having a base station and subscriber terminals, the method comprising the steps of: grouping first subscriber terminals, which request a sleep operation to the base station, into several groups for controlling the sleep mode; establishing each point of time for transmitting a paging message of each group which is different from each other within a unit time slot for controlling the sleep mode; and managing a sleep interval scheduling table, which manages sleep interval scheduling information of each first subscriber terminal, according to each group in response to a request for a state transition into the sleep mode by the first subscriber terminals.

In addition, in order to accomplish these objects, there is provided a system for controlling a sleep mode including sleep intervals and awake intervals in a broadband wireless access communication system having a base station and subscriber terminals, the system comprising: a grouping part for grouping first subscriber terminals subject to a sleep mode control into predetermined groups; a management part of a paging message transmission slot of each group for establishing and for managing different points of time for transmitting the paging message of each group within a unit time slot for controlling the sleep mode; a transmission/reception part for receiving a sleep request message which represents a request for a state transition into the sleep mode from the subscriber terminals and for transmitting a response message to the first subscriber terminals in response to the request for the state transition into the sleep mode; and a management part of a sleep interval scheduling table of each group for managing the sleep interval scheduling table of each of the first subscriber terminals in response to the request for the state transition (sleep request).

It is preferred that the system for controlling a sleep mode further comprises a previous-traffic indicator bit formation part for notifying when no data is to be transmitted to any one subscriber terminal included in each group in advance.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
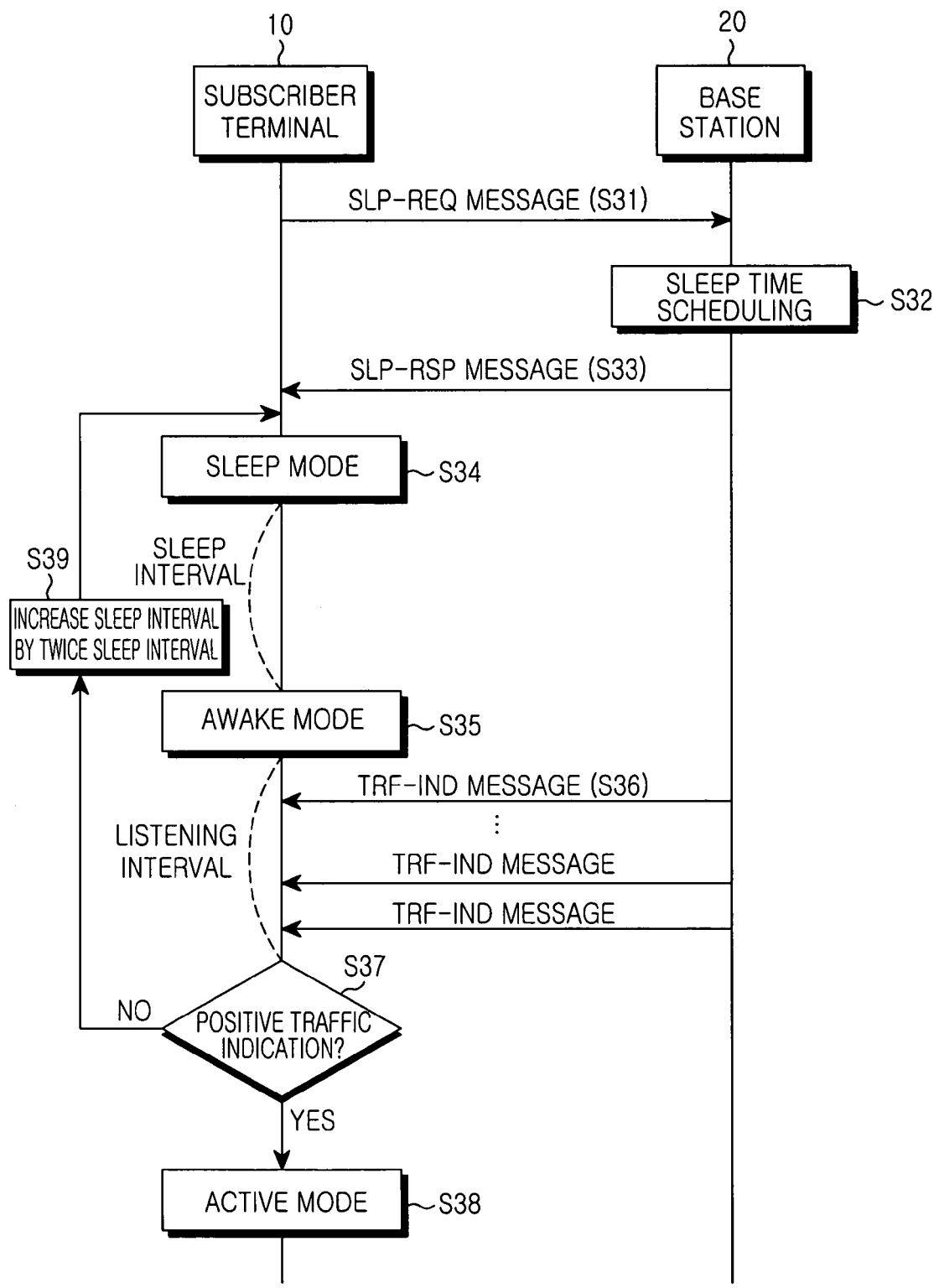
FIG. 1 is a schematic view showing a procedure for controlling a sleep mode proposed for an IEEE 802.16e communication system.
Figure 2A:
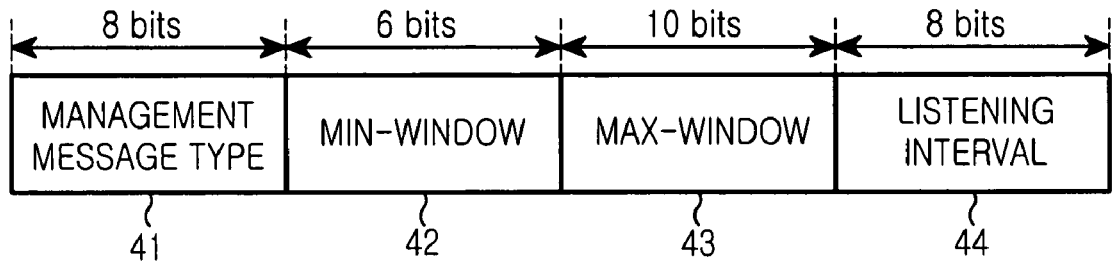
FIGS. 2a to 2d show the format of messages communicated between a base station and a subscriber terminal in order to control a sleep mode in an IEEE 802.16e communication system.
Figure 2B:
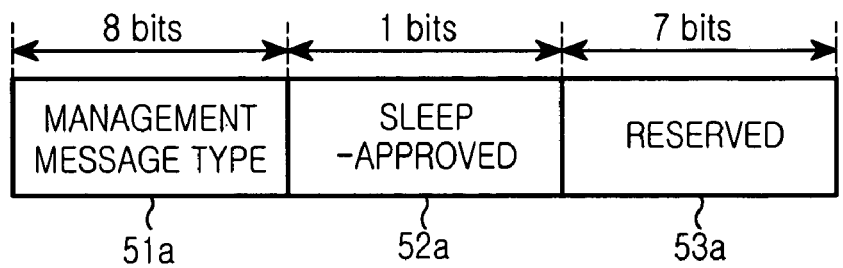
Figure 2C:
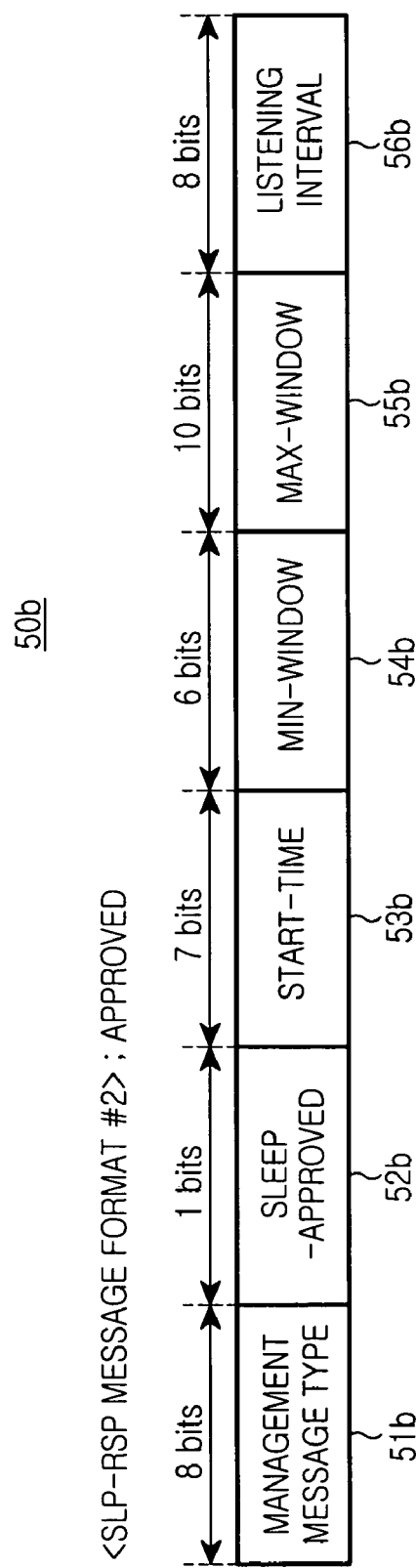
Figure 2D:
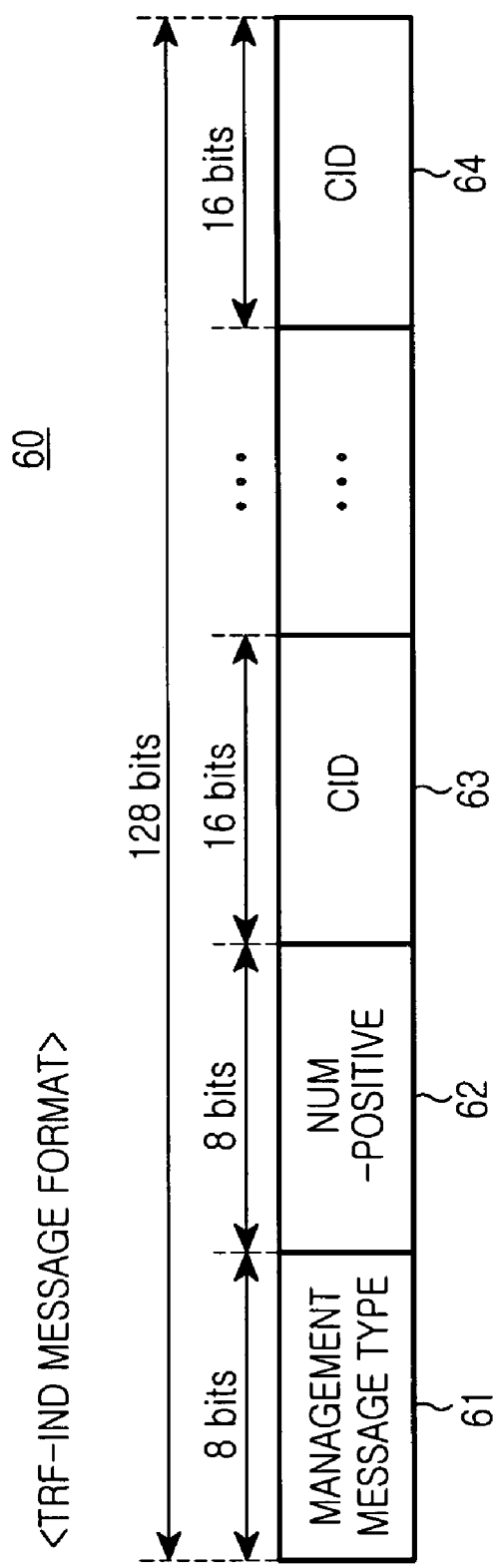
Figure 3:
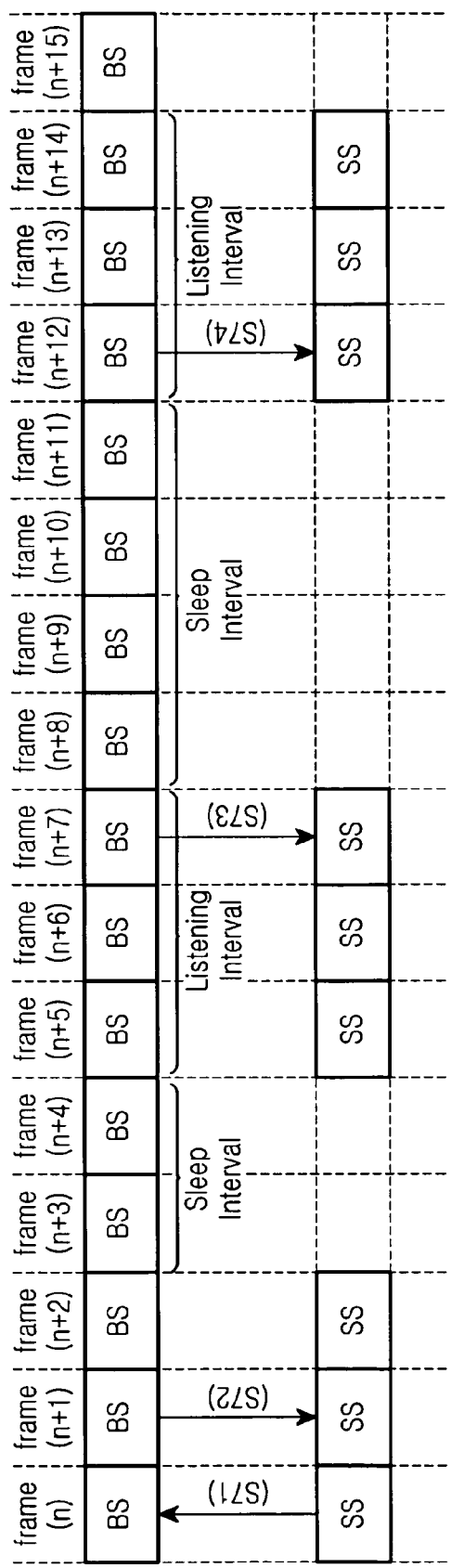
FIG. 3 explains a sleep interval update algorithm which is proposed for the IEEE 802.16e communication system.

Hereinafter, preferred embodiments of the present invention will be described in detail with reference to the accompanying drawings. Note that the same or similar components in the drawings are designated by the same reference numerals as far as possible even if they are shown in different drawings. In the following description of the present invention, a detailed description of known functions and configurations incorporated herein will be omitted to avoid making the subject matter of the present invention unclear.

Figure 4:
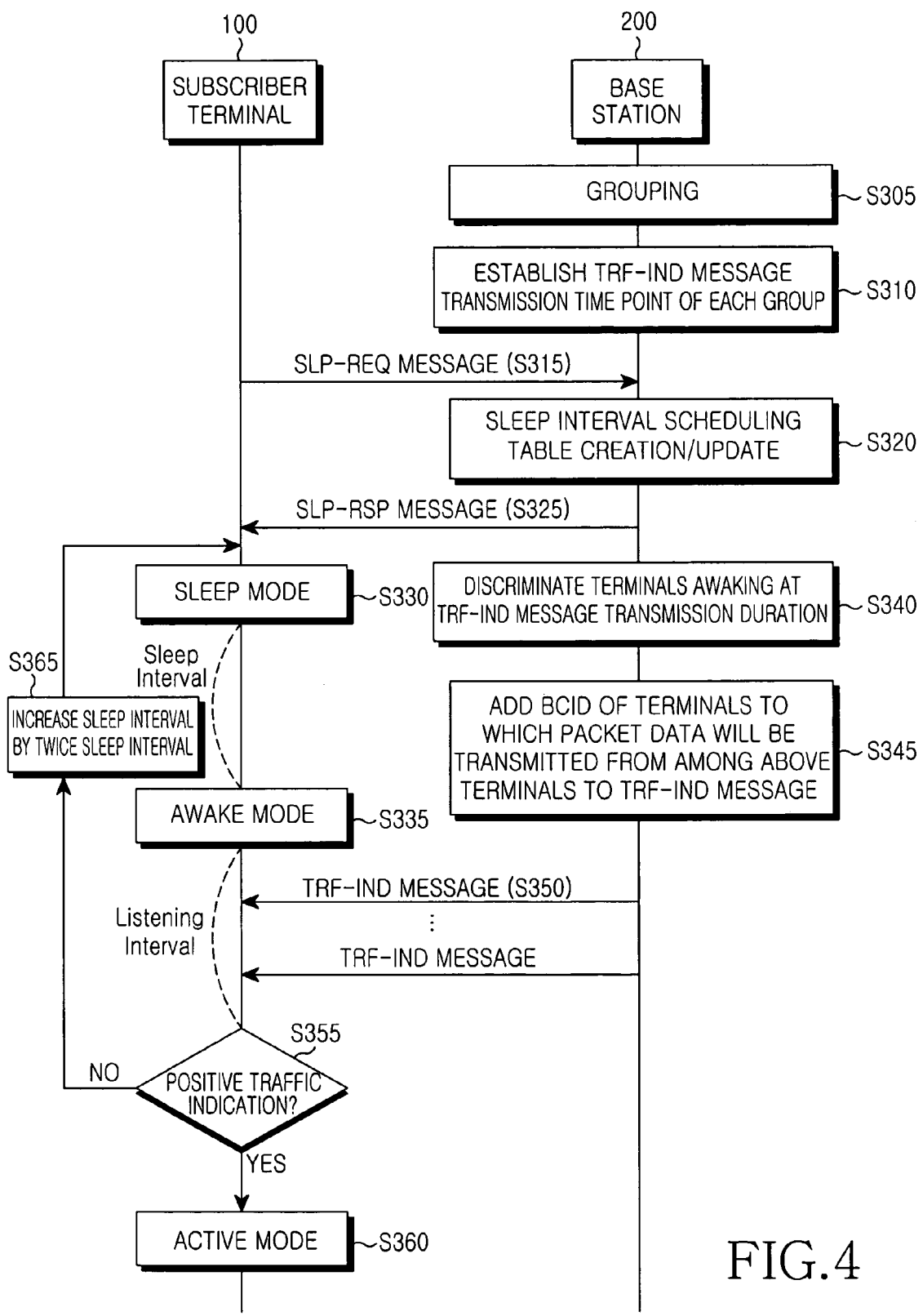
FIG. 4 is a flowchart of a processing procedure for controlling a sleep mode between a subscriber terminal and a base station according to one embodiment of the present invention.

FIG. 4 is a flowchart of a processing procedure for controlling a sleep mode between a subscriber terminal and a base station according to one embodiment of the present invention. That is, FIG. 4 is a view showing a processing procedure for controlling a sleep mode including sleep intervals and awake intervals in a broadband wireless access communication system having a base station 200 and subscriber terminals 100.

Referring to FIG. 4, in order to control the sleep mode according to one embodiment of the present invention, the base station 200 firstly divides subscriber terminals requesting a sleep operation to the base station 200 into predetermined groups (S305). At this time, a grouping for the subscriber terminals can be performed in various manners.

First, according to a request order of the subscriber terminals for the sleep operation, which is transmitted to the base station, the grouping is performed with respect to the subscriber terminals such that each group includes a predetermined number of the subscriber terminals. Whenever the number the subscriber terminals carrying out the sleep operation increases by the predetermined number, the number of groups may dynamically increase. For example, if each group is established to have four subscriber terminals, first to fourth subscriber terminals requesting the sleep operation to the base station are included in a first group. Also, fifth to eighth subscriber terminals requesting the next sleep operation are included in a second group. In addition, if two subscriber terminals of the subscriber terminals included in the first group are shifted into an active state after finishing the sleep operation, the two subscriber terminals are removed from the first group. After that, when a new subscriber terminal requests the sleep operation, the new subscriber terminal is dynamically assigned in the first group. For instance, if three subscriber terminals included in the base station are carrying out the sleep operation, the base station has only one group. If five subscriber terminals included in the base station are carrying out the sleep operation, the base station has two groups. At this time, as the number of the subscriber terminals carrying out the sleep operation increases, the number of groups may increase.

As described above, the method of dynamically creating and removing groups and the subscriber terminals included in the groups enables the base station to efficiently manage the subscriber terminals carrying out the sleep operation, with the minimum number of groups.

Meanwhile, different from the above method, another method of assigning the subscriber terminals to each group with the fixed number of groups can be used. This other method of grouping the subscriber terminals utilizes resultant values obtained by performing a modulo calculation for a subscriber terminal identification (BCID), which is assigned to each subscriber terminal by the base station, by utilizing the predetermined number of the groups. For example, if four groups are established in the base station, the subscriber terminals are grouped into zero to third groups based on a reminder obtained through dividing BCIDs of the subscriber terminals requesting the sleep operation to the base station by '4'. That is, the subscriber terminals are grouped into a zero group including the subscriber terminals having a remainder '0' (group 0), a first group including the subscriber terminals having a remainder '1' (group 1), a second group including the subscriber terminals having a remainder '2' (group 2), and third group including the subscriber terminals having a remainder '3' (group 3).

Figure 6:
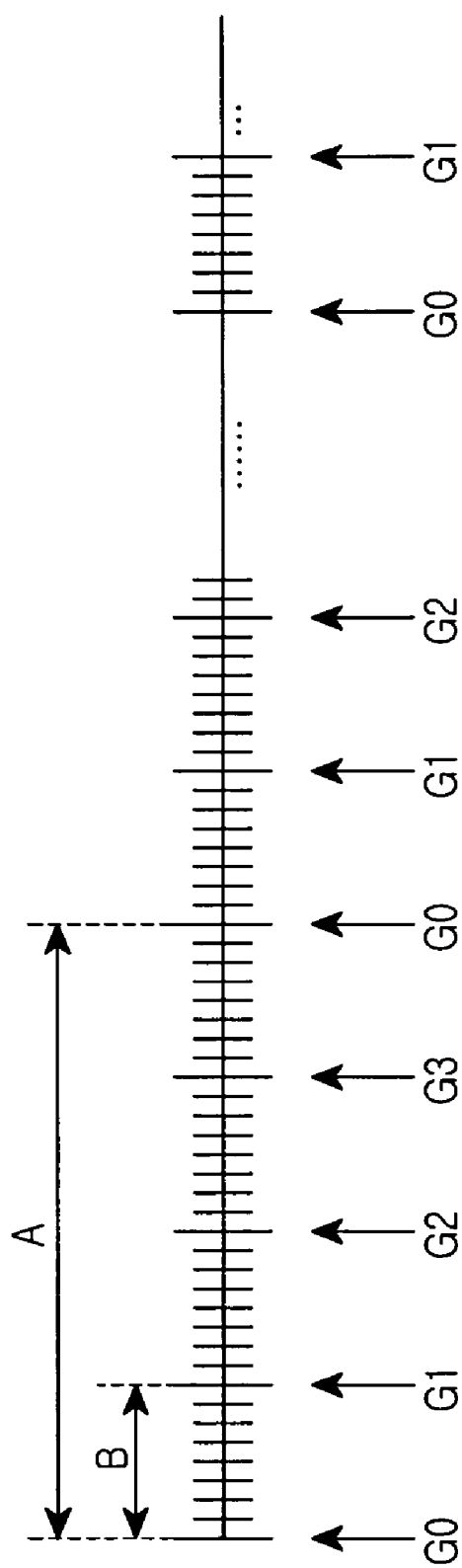
FIG. 6 is a view showing a point of time for transmitting a TRF-IND message of each group established differently from each other within a predetermined time slot according to one embodiment of the present invention.

After grouping the subscriber terminals as described above (S305), the base station 200 establishes a start time for transmitting a TRF-IND message of each group (that is, a paging message) (S310). That is, the start time for transmitting the TRF-IND message of each group is different from other groups within a unit time slot (e.g., a minimum time slot allowed by the base station) for controlling the sleep mode. An example of the differently-established start time for transmitting the TRF-IND message within a predetermined time slot (e.g., the unit time slot) is explained with reference to FIG. 6. Referring to FIG. 6, a section for one frame A is divided into four similar sections B. In addition, a start point of each divided section is established as a TRF-IND message transmission time of each of four groups G0, G1, G2, and G3.

After the base station 200 performs a preliminary process for controlling the sleep mode through steps 305 and 310, the base station 200 waits for the sleep request message (hereinafter, referred to as 'SLP-REQ message') from the subscriber terminal 100.

Meanwhile, the subscriber terminal 100 transmits the SLP-REQ message including all required sleep interval scheduling information, such as a minimum time slot MIN-WINDOW, a maximum time slot MAX-WINDOW, and a listening interval LISTEN INTERVAL (S315).

When receiving the SLP-REQ message for a state transition into the sleep mode from the subscriber terminal 100, the base station 200 creates and updates a sleep interval scheduling table for each group of subscriber terminals (S320). That is, the base station 200 manages the sleep interval scheduling table capable of managing the sleep interval scheduling information for each subscriber terminal unit, according to each group by using the sleep interval scheduling information (the minimum time slot MIN-WINDOW, the maximum time slot MAX-WINDOW, and the listening interval LISTEN INTERVAL) included in the sleep request message.

To this end, the base station 200 determines the minimum time slot, the maximum time slot, and the listening interval of the subscriber terminal 100 with reference to predetermined sleep control information (e.g., an admittable minimum time slot, an admittable maximum time slot, and an admittable listening interval) and sleep interval scheduling information specified in the SLP-REQ message. Also, the base station 200 determines state information of each unit time slot of the subscriber terminal 100 based on the determined minimum time slot, the determined maximum time slot, and the determined listening interval. Furthermore, the base station 200 registers sleep interval scheduling information, which includes the minimum time slot, the maximum time slot, the listening interval, and state information of each unit time slot of the subscriber terminal 100, together with identification information of the subscriber terminal 100 in the sleep interval scheduling table.

Figure 7:
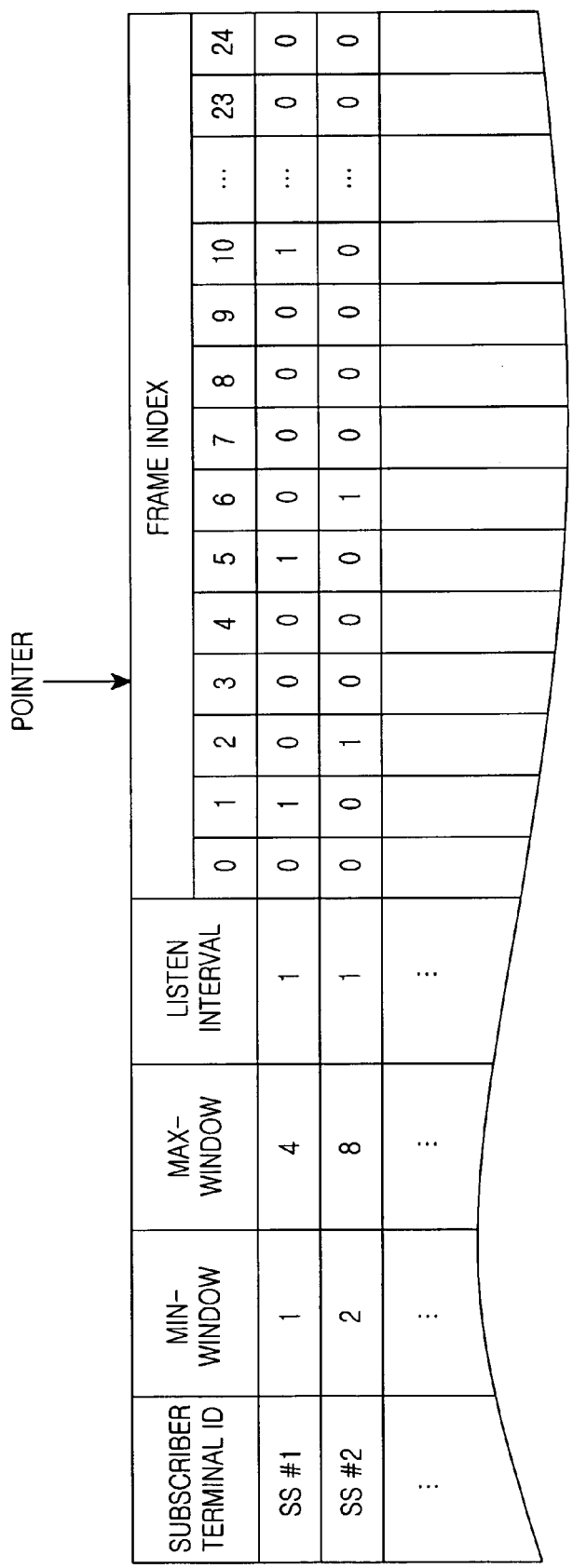
FIG. 7 is a view showing a sleep interval scheduling table of each group created while controlling a sleep mode according to one embodiment of the present invention.

An example of the created sleep interval scheduling table is shown in FIG. 7. Referring to FIG. 7, the sleep interval scheduling table includes identification information ID of the subscriber terminal, a minimum time slot MIN-WINDOW, a maximum time slot MAX-WINDOW, a listening interval, and state information of each time slot (frame) of the subscriber terminal. Such a sleep interval scheduling table manages the sleep interval scheduling information of each subscriber terminal by using the predetermined number of the unit time slot. Also, in the sleep interval scheduling table, a pointer, which indicates a predetermined point of time in a unit time slot, is shifted according to a lapse of time. FIG. 7 shows an example that sleep interval scheduling information of each subscriber terminal is managed by using 24 unit time slots and the pointer indicates a frame '3'. If the pointer indicates a last unit time slot (e.g., frame index 24), the base station updates sleep interval scheduling information of all subscriber terminals registered in the sleep interval scheduling table and a unit time slot to be indicated by the pointer will change to an initial unit time slot (e.g., frame index 1).

Meanwhile, as shown in FIG. 7, state information of each unit time slot of the subscriber terminal is marked as '0' or '1'. That is, the sleep interval of the subscriber terminal is marked as '0' and the listening interval of the subscriber terminal is marked as '1'. In other words, a corresponding subscriber terminal awakes when a value of state information is '1'. As shown in FIG. 7, a subscriber terminal SS#1 awakes when the unit time slot is '1', '5', or '10' so as to check the TRF-IND message transmitted to the subscriber terminal SS#1 during the listening interval. Also, a subscriber terminal SS#2 awakes when the unit time slot is '2', or '6' in order to check the TRF-IND message transmitted to the subscriber terminal SS#2. At this time, the subscriber terminals check their own BCIDs in the TRF-IND messages during the listening interval. If BCIDs of the subscriber terminal are not included in the TRF-IND messages, the subscriber terminals do not stay in an awake mode waiting for the next unit time slot, but directly perform a state transition into the sleep mode as soon as the listening interval lapses.

If there is a subscriber terminal performing the state transition from the sleep mode into an active mode, the base station removes identification information of the subscriber terminal and sleep interval scheduling information of the subscriber terminal from the sleep interval scheduling table. As shown in FIG. 7, if the subscriber terminal SS#2 performs the state transition into the active mode when the frame index is '2', the base station removes identification information of the subscriber terminal SS#2 and sleep interval scheduling information of the subscriber terminal SS#2 (e.g., the subscriber terminal SS#2 field) from the sleep interval scheduling table when the frame index is '3'.

Meanwhile, as shown in FIG. 4, after creating and updating the sleep interval table through step 320, the base station 200 transmits the SLP-RSP message corresponding to the SLP-REQ message to the subscriber terminal 100 (S325). At this time, the base station 200 transmits the number of frames remaining until the subscriber terminal 100 enters into the sleep mode (START-TIME, hereinafter, referred to as, 'a start time'), the minimum time slot value MIN-WINDOW, the maximum time slot value MAX-WINDOW, and the listening interval value LISTENING INTERVAL which are approved by the base station.

The subscriber terminal 100 receiving the SLP-RSP message performs the state transition into the sleep mode at a start time of the sleep mode included in the SLP-RSP message START-TIME (S330) and performs the state transition into the awake mode after the sleep interval included in the SLP-RSP message elapses (S335), so that the subscriber terminal 100 waits for the TRF-IND message from the base station 200 during the listening interval LISTENING INTERVAL included in the SLP-RSP message.

Meanwhile, on the basis of the sleep interval scheduling table of each group managed in above step 320, the base station 200 discriminates predetermined groups of subscriber terminals awaking when the TRF-IND message of the group is transmitted to subscriber terminals included in the corresponding group at a corresponding point of time for transmitting the TRF-IND message, which has been determined in step 310 (S340). Also, the base station adds the subscriber terminal identifications (BCIDs) of the predetermined subscriber terminals of the discriminated subscriber terminals, which correspond to packet data (PDU) to be transmitted by the base station, to the TRF-IND message which will be transmitted at the TRF-IND message transmitting time, so that the base station transmits the TRF-IND message (S350).

Then, the subscriber terminal 100, which has been awakened in above step 335 and then waits for the TRF-IND message, receives the TRF-IND message transmitted in above step 350 and checks whether the TRF-IND message is a positive traffic message or a negative traffic message (S355). That is, the subscriber terminal 100 checks whether or not the received TRF-IND message includes the subscriber terminal's own BCID. If the TRF-IND message is the positive traffic message, that is, the received TRF-IND message includes BCID of the subscriber terminal 100, the subscriber terminal 100 performs the state transition into the active mode (S360), otherwise, the subscriber terminal 100 transitions into the sleep mode (S330).

At this time, after the subscriber terminal 100 increases the sleep interval to twice as long as the previous sleep interval (S365), the subscriber terminal 100 maintains the sleep mode S330 during the sleep interval except for the listening interval. Thereafter, the subscriber terminal 100 awakes in order to be operated as the awake mode during the listening interval. The subscriber terminal 100 repeatedly operates as the sleep mode and the awake mode until a state of the subscriber terminal 100 shifts into the active mode. Whenever the subscriber terminal 100 repeatedly performs the sleep mode and the awake mode, the subscriber terminal 100 exponentially increases the sleep interval twice as long as compared with the previous sleep interval until the maximum time slot, which the base station 200 grants to the subscriber terminal 100, is reached. At this time, the sleep interval of the subscriber terminal updated in above step 365 is the same as information included in the sleep interval scheduling table managed by the base station 200. This is because the subscriber terminal 100 and the base station 200 use the same sleep interval scheduling information to perform scheduling with respect to the sleep interval of the subscriber terminal 100.

At this time, it is preferred when the base station 200 does not have any data to transmit to the subscriber terminals awaking at the point of time for transmitting the TRF-IND message, the base station 200 provides advance notice to the subscriber terminals, so that the subscriber terminals can enter the sleep mode as soon as possible.

For example, if the base station 200 does not have any data to transmit to the subscriber terminals awaking at the point of time for transmitting the TRF-IND message, the base station 200 transmits a frame by setting a previous-traffic indicator bit (Pre-Traffic Indicator bit) of a frame control header as '0' instead of transmitting the TRF-IND message. In contrast, if the base station 200 does have data to transmit to at least one subscriber terminal from among the subscriber terminals awaking at the point of time for transmitting the TRF-IND message, the base station 200 transmits the TRF-IND message having an identification number (BCID) of the subscriber terminal and simultaneously transmits the frame by setting the previous-traffic indicator bit (Pre-Traffic Indicator bit) of the frame control header as '1'.

At this time, although the frame control header is data located in a frame where the TRF-IND message is located, the frame control header is located at a first position of the frame. Also, since the frame control header is not modulated and channel-coded, data can be instantly confirmed.

The subscriber terminal, which has been awaked at the point of time for transmitting the TRF-IND message and waits for the TRF-IND message, firstly checks the previous-traffic indicator bit (Pre-Traffic Indicator bit) of the frame control header. If a value of the checked bit is '0', the subscriber terminal determines that no data was sent and directly performs the state transition into the sleep mode. If the value of the checked bit is '1', after receiving the TRF-IND message, the subscriber terminal then determines whether the TRF-IND message includes its own identification BCID (S355).

Figure 5:
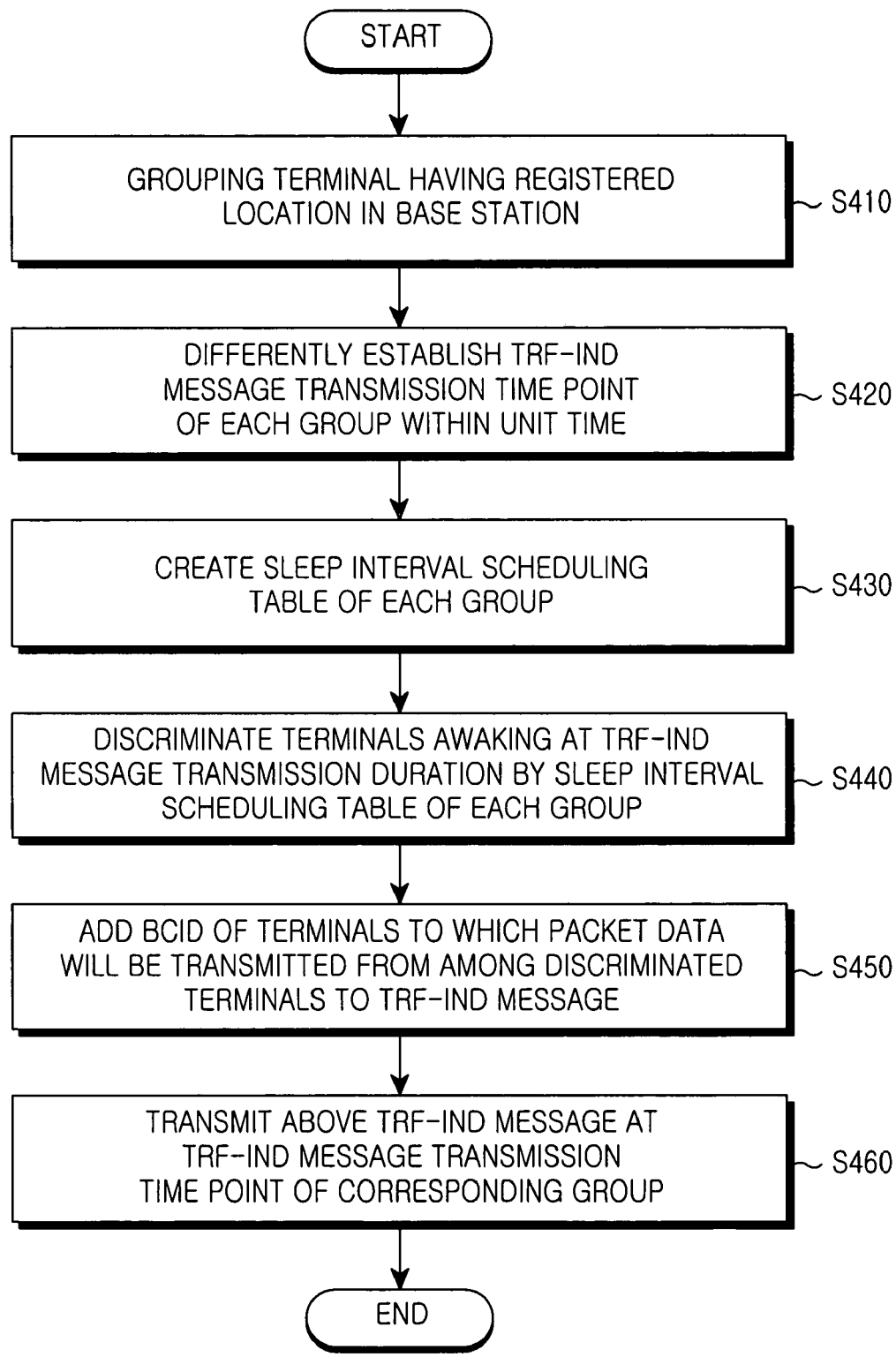
FIG. 5 is a flowchart showing a processing procedure of a base station for controlling a sleep mode according to one embodiment of the present invention.

FIG. 5 is a flowchart showing a processing procedure of a base station for controlling a sleep mode according to one embodiment of the present invention. Referring FIG. 5, in order to control a sleep mode, a base station firstly performs grouping work with respect to subscriber terminals, which register their locations in a corresponding base station (S410). It is possible to use the grouping method described in step 305 shown in FIG. 4. Each point of time for transmitting a TRF-IND message of each group is established differently from each other within a predetermined unit time slot (e.g., frame) (S420). Also, if the base station receives a sleep request message from the subscriber terminal, the base station creates a sleep interval scheduling table of each group depending on information included in the sleep request message (S430).

Furthermore, the base station discriminates the subscriber terminals awaking in the TRF-IND message transmission slot based on the sleep interval scheduling table of each group (S440). The base station adds BCIDs of the subscriber terminals, to which PDU data will be transmitted, to the TRF-IND message (S450). The base station transmits the TRF-IND message at the point of time for transmitting the TRF-IND message of a corresponding group of the TRF-IND message transmission slot (S460). When performing step 460, it is preferred that the base station determines whether any subscriber terminals are to receive data from the base station from among subscriber terminals awaking at the point of time for transmitting the TRF-IND message of a corresponding group, and sets a previous-traffic indicator bit (Pre-Traffic Indicator bit) of a frame control header, which is located in a first position of the frame where the TRF-IND message is sent, according to the determination. For example, if it is determined that if there are no subscriber terminals to receive data from the base station from among subscriber terminals awaking at a point of time for transmitting the TRF-IND message, the base station sets the bit as '0' to transmit the frame. If it is determined that at least one subscriber terminal will receive data from the base station from among subscriber terminals awaking at the point of time for transmitting the TRF-IND message, the base station sets the bit as '1' to transmit the frame.

Steps shown in FIG. 5 correspond to steps performed by the base station in FIG. 4. That is, steps 410, 420, 430, 440, 450, and 460 shown in FIG. 5 correspond to steps 305, 310, 320, 340, 345, and 350 shown in FIG. 4. Accordingly, the description of each step shown in FIG. 5 is omitted in the following description.

Figure 8:
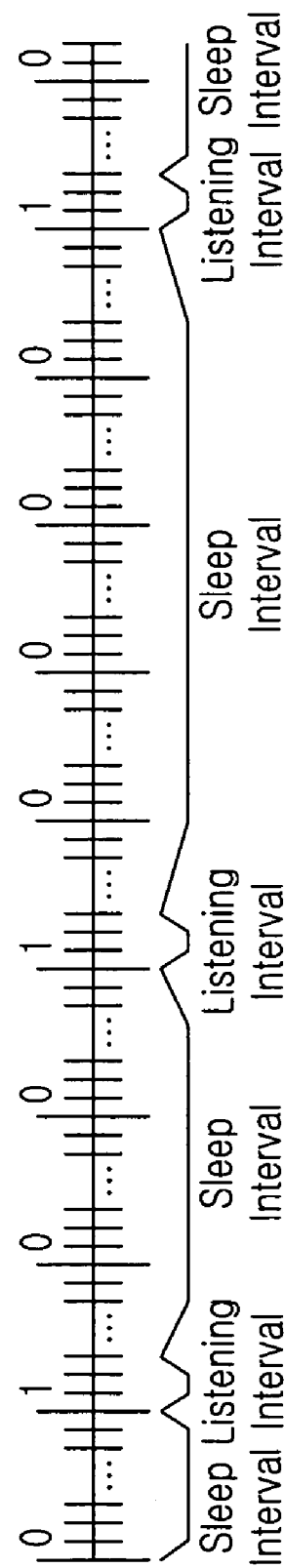
FIG. 8 provides an example of a sleep operation based on a sleep interval scheduling table of each group according to one embodiment of the present invention.

FIG. 8 provides an example of a sleep operation by a sleep interval scheduling table of each group according to one embodiment of the present invention. That is, FIG. 8 shows an actual operation of the subscriber terminals during unit time slots according to a bit value '0' or '1' in the sleep interval scheduling table. If the unit time slot is marked as '0', the subscriber terminals operate with the sleep mode during the unit time slot. On the contrary, if the unit time slot is marked as '1', the subscriber terminals operate with the awake mode during the listening interval from a start frame of the unit time slot and with the sleep mode during a remaining time.

Figure 9:
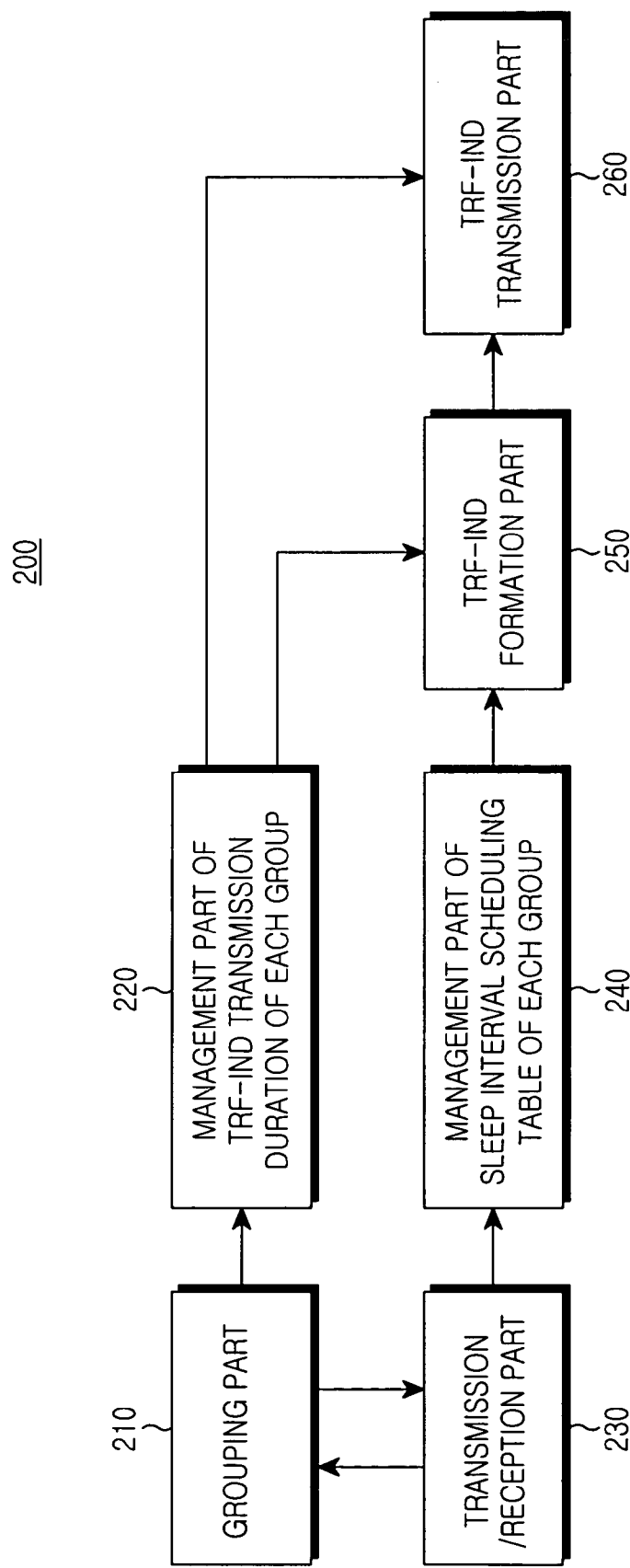
FIG. 9 is a block diagram schematically showing a sleep mode control system according to one embodiment of the present invention.

FIG. 9 is a block diagram schematically showing a sleep mode control system 200 according to one embodiment of the present invention. Referring to FIG. 9, the sleep mode control system 200 of the present invention includes a grouping part 210, a management part of a TRP-IND transmission slot of each group 220, a transmission/reception part 230, a management part of a sleep interval scheduling table of each group 240, a TRF-IND formation part 250, and a TRF-IND transmission part 260. At this time, the sleep mode control system 200 can be provided in the base station of an IEEE 802.16e communication system or can be realized as a separate system with respect to the base station. FIG. 9 shows the sleep mode control system 200 established in a base station system.

The grouping part 210 divides subscriber terminals subject to a sleep mode control into several predetermined groups. It is possible to use various methods for grouping the subscriber terminals in the grouping part 210.

First, the grouping part 210 groups the subscriber terminals such that each group includes the predetermined number of the subscriber terminals in the order of the subscriber terminals' requests for the sleep operation to the base station and can increase the number of groups whenever the number of the subscriber terminals exceeds the predetermined number. Also, the grouping part 210 can group the subscriber terminals depending on a resultant value of a modulo calculation by using the predetermined number of groups with respect to a subscriber terminal identification number (BCID), which is assigned to each subscriber terminal by the base station. The ways to group the subscriber terminals have been explained in detail with reference to FIGS. 4 and 5, and such explanation is not repeated below.

The management part of the TRP-IND transmission slot of each group 220 differently establishes and manages each point of time for transmitting the TRF-IND message of each group within a unit time slot for controlling the sleep mode.

The transmission/reception part 230 receives a sleep request message SLP-REQ message, which represents a request for a state transition into the sleep mode, from the subscriber terminal and transmits a response message SLP-RSP message to the corresponding subscriber terminal in response to the request for the state transition into the sleep mode.

The management part of the sleep interval scheduling table of each group 240 manages the sleep interval scheduling table of each group including subscriber terminals in response to the SLP-REQ message. For example, the management part of the sleep interval scheduling table of each group 240 determines a minimum time slot, a maximum time slot, and a listening interval of a corresponding subscriber terminal in response to the request for the state transition into the sleep mode (sleep request).

The management part of the sleep interval scheduling table of each group 240 determines state information of each unit time slot of the corresponding subscriber terminal based on the determined minimum time slot, the determined maximum time slot, and the determined listening interval. Furthermore, the management part of the sleep interval scheduling table of each group 240 registers sleep interval scheduling information, which includes the minimum time slot, the maximum time slot, the listening interval, and the state information of each unit time slot of the subscriber terminal, together with identification information of the corresponding subscriber terminal in the sleep interval scheduling table. The management part of the sleep interval scheduling table of each group 240 removes from the sleep interval scheduling table sleep interval scheduling information and identification information of subscriber terminals that perform the state transition from the sleep mode into an active mode.

Meanwhile, the management part of the sleep interval scheduling table of each group 240 manages sleep interval scheduling information of each subscriber terminal by the predetermined number of the unit time slots and shifts a pointer, which indicates a predetermined point of time of a unit time slot, according to a lapse of time. If the pointer indicates the last unit time slot, the management part of the sleep interval scheduling table of each group 240 updates sleep interval scheduling information of all subscriber terminals registered in the sleep interval scheduling table and establishes the next unit time slot, which the pointer will indicate, as an initial unit time slot.

Such an operation of the management part of the sleep interval scheduling table of each group 240 has been particularly described in a part explained with reference to FIG. 7.

On the basis of the sleep interval scheduling table of each group, from among subscriber terminals included in a group corresponding to each point of time for transmitting a TRF-IND message of each group, the TRF-IND formation part 250 discriminates groups of subscriber terminals awaking at the point of time for transmitting the TRF-IND message of the group, in which each point of time for transmitting the TRF-IND message of each group is managed by the management part of a TRF-IND transmission slot of each group 220. After that, the TRF-IND formation part 250 adds the subscriber terminal identification numbers (BCIDs) of subscriber terminals corresponding to packet data to be transmitted, from among the discriminated subscriber terminals to the TRF-IND message which will be sent at the point of time for transmitting the TRF-IND message corresponding to the group.

The TRF-IND transmission part 260 receives information about each point of time for transmitting a TRF-IND message of each group from the management part of the TRP-IND transmission slot of each group 220 so as to transmit the TRF-IND message formed by the TRF-IND formation part 250 based on such information.

Also, it is preferred that the sleep mode control system 200 further includes a previous-traffic indicator (Pre-Traffic Indicator) bit formation part (not shown) which provides previous notification when there is no data to be transmitted to subscriber terminals included in a group.

That is, the previous-traffic indicator bit formation part provides information representing whether data exists to be transmitted to subscriber terminals awaking at a point of time for transmission of the TRF-IND message. After the previous-traffic indicator bit formation part establishes the previous-traffic indicator bit based on such information, it sends the previous-traffic indicator bit to the TRF-IND formation part 250. For example, the previous-traffic indicator bit formation part sets the previous-traffic indicator bit as '0' when no data will be transmitted to subscriber terminals awaking at the point of time for transmitting the TRF-IND message and sets the previous-traffic indicator bit as '1' when there is data to transmit to at least one subscriber terminal awaking at the point of time for transmitting the TRF-IND message. The previous-traffic indicator bit is then sent to the TRF-IND formation part 250.

As described above, according to the present invention, the subscriber terminals are managed by grouping the subscriber terminals in a broadband wireless access communication system, increasing the efficiency for controlling the sleep mode of the broadband wireless access communication system. Also, the present invention has an advantage that each point of time for transmitting a paging message of each group is established as being different from each other within a unit time slot for controlling the sleep mode, such that subscriber terminals are managed according to groups. Furthermore, the present invention has another advantage that the base station can identify subscriber terminals awaking at a particular point of time for transmission of the paging message, thereby increasing the efficiency for controlling the sleep mode of the broadband wireless access communication system. Also, according to the present invention, when a small number of subscriber terminals are in the same group awaked at the same frame and no data exists to be transmitted to any of the subscriber terminals it unnecessary to form the TRF-IND message. Rather, the previous-traffic indicator bit (Pre-Traffic Indicator bit) is established as a predetermined value to provide advance notice information that the TRF-IND message does not exist. That is, the subscriber terminal need only read a frame control header value, and if the Pre-Traffic Indicator bit is '0', the subscriber terminals enter into the sleep mode without waiting for the TRF-IND message. For this reason, the present invention reduces power consumption by subscriber terminals.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for controlling a sleep mode including sleep intervals and awake intervals in a broadband wireless access communication system having a base station and subscriber terminals, the method comprising the steps of:
    grouping first subscriber terminals, which request a sleep operation to the base station, into several groups for controlling the sleep mode;
    establishing each point of time for transmitting a paging message to each group different from each other within a unit time slot for controlling the sleep mode; and
    managing a sleep interval scheduling table, which manages sleep interval scheduling information of each first subscriber terminal, according to each group in response to a request for a state transition into the sleep mode of the first subscriber terminals, wherein the grouping step is performed with respect to the subscriber terminals in an order of requests of the subscriber terminals for the sleep operation to the base station such that each group includes a predetermined number of the first subscriber terminals and the number of the groups increases whenever the number of the first subscriber terminals exceeds the predetermined number.

2. The method as claimed in claim 1, further comprising the steps of:
    discriminating second subscriber terminals awaking at a corresponding point of time for transmitting the paging message to a corresponding group from among the first subscriber terminals on a basis of the sleep interval scheduling table;

adding subscriber terminal identification numbers (BC-IDs) of third subscriber terminals to which packet data is to be transmitted and which are selected from the second subscriber terminals to which the paging message are transmitted, to the paging message and transmitting the paging message; and releasing the sleep mode of the third subscriber terminals which receive the paging message.

3. The method as claimed in claim 2, wherein a flag is included in a frame control header of the transmitted paging message to indicate whether or not the third subscriber terminals exist, n the second subscriber terminals, to which the packet data are transmitted.

4. The method as claimed in claim 3, wherein the flag is set as '1' if the third subscriber terminals, to which the packet data are transmitted, are included in the second subscriber terminals, and the flag is set as '0' if the second subscriber terminals does not include any third subscriber terminals.

5. The method as claimed in claim 3, wherein the flag is a previous-traffic indicator bit of the frame control header.

6. The method as claimed in claim 2, wherein a minimum time slot, a maximum time slot, and a listening interval of the first subscriber terminal in response to a request for the state transition into the sleep mode are determined, state information of each unit time slot of the first subscriber terminal on a basis of the determined minimum time slot, the determined maximum time slot, and the determined listening interval is determined, and the sleep interval scheduling information which includes the minimum time slot, the maximum time slot, the listening interval, and state information of each unit time slot of the first subscriber terminal is registered together with identification information of the first subscriber terminal in the sleep interval scheduling table.

7. The method as claimed in claim 6, wherein sleep interval scheduling information of fourth subscriber terminals which perform the state transition from the sleep mode into an active mode and identification information of the fourth subscriber terminals is removed from the sleep interval scheduling table.

8. The method as claimed in claim 6, wherein sleep interval scheduling information of each first subscriber terminal by using the predetermined number of the unit time slot is managed, a pointer, which indicates a predetermined point of time of the unit time slot, is shifted according to a lapse of time, and when the pointer indicates a last unit time slot, sleep interval scheduling information of all subscriber terminals registered in the sleep interval scheduling table is updated and a unit time slot which is to be indicated by the pointer is established as an initial unit time slot.

9. The method as claimed in claim 1, wherein, by using the groups, the grouping is performed with respect to the subscriber terminals on a basis of resultant values obtained by a modulo calculation for a subscriber terminal identification (BCID) which is assigned to each subscriber terminal by the base station.

10. The method as claimed in claim 1, further comprising assigning the subscriber terminals to each group with the number of groups being fixed.

11. A system for controlling a sleep mode including sleep intervals and awake intervals in a broadband wireless access communication system having a base station and subscriber terminals, the system comprising:

a grouping part for grouping first subscriber terminals subject to a sleep mode control into predetermined groups;

a management part of a paging message transmission slot of each group for establishing and for managing each different point of time for transmitting a paging message to each group within a unit time slot for controlling a sleep mode;

a transmission/reception part for receiving a sleep request message which represents a request for a state transition into the sleep mode from the subscriber terminals and for transmitting a response message to the first subscriber terminals in response to the request for the state transition into the sleep mode; and a management part of a sleep interval scheduling table of each group for managing the sleep interval scheduling table of each of the first subscriber terminals in response to the request for the state transition, wherein the grouping part performs grouping with respect to the first subscriber terminals in an order of requests of the first subscriber terminals for the sleep operation to the base station such that each group includes a predetermined number of the subscriber terminals and increases the number of the groups whenever the subscriber terminals performing the sleep operation increase by the predetermined number of the subscriber terminals.

12. The system as claimed in claim 11, further comprising:

a paging message formation part for discriminating second subscriber terminals awaking at a corresponding point of time for transmitting the paging message of a corresponding group from the first subscriber terminals based on the sleep interval scheduling table, and for adding identification numbers (BCIDs) of third subscriber terminals, to which packet data are transmitted and which are selected from among the second subscriber terminals, to the paging message and transmitting the paging message to the corresponding group, wherein the point of time for transmitting the paging message of the group is managed by the management part of the paging message transmission slot of each group; and a paging message transmission part for receiving information about each point of time for transmitting the paging message of each group from the management part of the paging message transmission slot of each group, thereby transmitting the paging message formed by the paging message formation part based on such information.

13. The system as claimed in claim 12, further comprising a previous-traffic indicator bit formation part for providing advance notification of whether any data exists to be transmitted to the third subscriber terminals, wherein the previous-traffic indicator bit formation part receives information representing whether the third subscriber terminals, to which data are transmitted, are included in the second subscriber terminals awaking at the point of time for transmission of the paging message and sends a previous-traffic indicator bit to the paging message formation part after establishing the previous-traffic indicator bit depending on such information.

14. The system as claimed in claim 13, wherein the previous-traffic indicator bit formation part sets the previous-traffic indicator bit as '1' if the third subscriber terminals, to which data are transmitted, are included in the second subscriber terminals awaking at the point of time for transmitting the paging message, and the previous-traffic indicator bit formation part establishes the previous-traffic indicator bit as '0' if the second subscriber terminals does not include any third subscriber terminals.

15. The system as claimed in claim 14, wherein the paging message formation part forms a paging message frame including the previous-traffic indicator bit and transmits only a frame control header of the paging message frame if the previous-traffic indicator bit is '0'.

16. The system as claimed in claim 11, wherein the grouping part performs a grouping with respect to the groups of first subscriber terminals on a basis of resultant values obtained by a modulo calculation for a subscriber terminal identification (BCID) which the base station assigns to each subscriber terminal.

17. The system as claimed in claim 11, wherein the management part of the sleep interval scheduling table of each group determines a minimum time slot, a maximum time slot, and a listening interval of the first subscriber terminal in response to a request for the state transition into the sleep mode, determines state information of each unit time slot of each first subscriber terminal on a basis of the determined minimum time slot, the determined maximum time slot, and the determined listening interval, and registers the sleep interval scheduling information which includes the minimum time slot, the maximum time slot, the listening interval, and state information of each unit time slot of the first subscriber terminal together with identification information of the first subscriber terminal in the sleep interval scheduling table.

18. The system as claimed in claim 17, wherein the management part of the sleep interval scheduling table of each group removes sleep interval scheduling information of fourth subscriber terminals which perform the state transition from the sleep mode into an active mode and identification information of the fourth subscriber terminal from the sleep interval scheduling table.

19. The system as claimed in claim 17, wherein the management part of the sleep interval scheduling table of each group manages sleep interval scheduling information of each first subscriber terminal by using the predetermined number of the unit time slot, shifts a pointer, which indicates a predetermined point of time of the unit time slot, according to a lapse of time, updates sleep interval scheduling information of all of the first subscriber terminals registered in the sleep interval scheduling table when the pointer indicates that a last unit time slot has been reached, and establishes a unit time slot which is to be indicated by the pointer is an initial unit time slot.

20. The system as claimed in claim 11, wherein the subscriber terminals are assigned to each group with the number of groups being fixed.

21. A method for controlling a sleep mode including sleep intervals and awake intervals in a broadband wireless access communication system having a base station and subscriber terminals, the method comprising the steps of:
grouping first subscriber terminals, which request a sleep operation to the base station, into several groups for controlling the sleep mode;
establishing each point of time for transmitting a paging message to each group different from each other within a unit time slot for controlling the sleep mode;
managing a sleep interval scheduling table, which manages sleep interval scheduling information of each first subscriber terminal, according to each group in response to a request for a state transition into the sleep mode of the first subscriber terminals;
discriminating second subscriber terminals awaking at a corresponding point of time for transmitting the paging message to a corresponding group from among the first subscriber terminals on a basis of the sleep interval scheduling table;
adding subscriber terminal identification numbers (BCIDs) of third subscriber terminals to which packet data is to be transmitted and which are selected from the second subscriber terminals to which the paging message are transmitted, to the paging message and transmitting the paging message; and
releasing the sleep mode of the third subscriber terminals which receive the paging message.

22. The method as claimed in claim 21, further comprising assigning the subscriber terminals to each group with the number of groups being fixed.

23. A system for controlling a sleep mode including sleep intervals and awake intervals in a broadband wireless access communication system having a base station and subscriber terminals, the system comprising:
a grouping part for grouping first subscriber terminals subject to a sleep mode control into predetermined groups;
a management part of a paging message transmission slot of each group for establishing and for managing each different point of time for transmitting a paging message to each group within a unit time slot for controlling a sleep mode;
a transmission/reception part for receiving a sleep request message which represents a request for a state transition into the sleep mode from the subscriber terminals and for transmitting a response message to the first subscriber terminals in response to the request for the state transition into the sleep mode;
a management part of a sleep interval scheduling table of each group for managing the sleep interval scheduling table of each of the first subscriber terminals in response to the request for the state transition;
a paging message formation part for discriminating second subscriber terminals awaking at a corresponding point of time for transmitting the paging message of a corresponding group from the first subscriber terminals based on the sleep interval scheduling table, and for adding identification numbers (BCIDs) of third subscriber terminals, to which packet data are transmitted and which are selected from among the second subscriber terminals, to the paging message and transmitting the paging message to the corresponding group, wherein the point of time for transmitting the paging message of the group is managed by the management part of the paging message transmission slot of each group; and
a paging message transmission part for receiving information about each point of time for transmitting the paging message of each group from the management part of the paging message transmission slot of each group, thereby transmitting the paging message formed by the paging message formation part based on such information.

24. The system as claimed in claim 23, wherein the subscriber terminals are assigned to each group with the number of groups being fixed.

25. A system for controlling a sleep mode including sleep intervals and awake intervals in a broadband wireless access communication system having a base station and subscriber terminals, the system comprising:
a grouping part for grouping first subscriber terminals subject to a sleep mode control into predetermined groups;

a management part of a paging message transmission slot of each group for establishing and for managing each different point of time for transmitting a paging message to each group within a unit time slot for controlling a sleep mode;

a transmission/reception part for receiving a sleep request message which represents a request for a state transition into the sleep mode from the subscriber terminals and for transmitting a response message to the first subscriber terminals in response to the request for the state transition into the sleep mode; and a management part of a sleep interval scheduling table of each group for managing the sleep interval scheduling table of each of the first subscriber terminals in response to the request for the state transition, wherein the management part of the sleep interval scheduling table of each group determines a minimum time slot, a maximum time slot, and a listening interval of the first subscriber terminal in response to a request for the state transition into the sleep mode, determines state information of each unit time slot of each first subscriber terminal on a basis of the determined minimum time slot, the determined maximum time slot, and the determined listening interval, and registers the sleep interval scheduling information which includes the minimum time slot, the maximum time slot, the listening interval, and state information of each unit time slot of the first subscriber terminal together with identification information of the first subscriber terminal in the sleep interval scheduling table.

26. The system as claimed in claim 25, wherein the subscriber terminals are assigned to each group with the number of groups being fixed.

* * * * *